United States Patent
Schreter

(10) Patent No.: US 11,556,545 B2
(45) Date of Patent: Jan. 17, 2023

(54) DISK BASED HYBRID TRANSACTIONAL ANALYTICAL PROCESSING SYSTEM

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 63 days.

(21) Appl. No.: 17/159,046

(22) Filed: Jan. 26, 2021

(65) Prior Publication Data

US 2022/0027372 A1 Jan. 27, 2022

Related U.S. Application Data

(60) Provisional application No. 63/056,304, filed on Jul. 24, 2020.

(51) Int. Cl.
| | |
|---|---|
| *G06F 16/22* | (2019.01) |
| *G06F 16/2457* | (2019.01) |
| *G06F 16/242* | (2019.01) |
| *G06F 16/2455* | (2019.01) |
| *G06F 16/248* | (2019.01) |
| *G06F 16/28* | (2019.01) |

(52) U.S. Cl.
CPC ...... *G06F 16/24573* (2019.01); *G06F 16/221* (2019.01); *G06F 16/2282* (2019.01); *G06F 16/248* (2019.01); *G06F 16/2428* (2019.01); *G06F 16/24561* (2019.01); *G06F 16/283* (2019.01)

(58) Field of Classification Search
None
See application file for complete search history.

(56) References Cited

U.S. PATENT DOCUMENTS

| | | | | |
|---|---|---|---|---|
| 9,613,120 | B1* | 4/2017 | Kharatishvili | G06F 16/27 |
| 11,144,407 | B1* | 10/2021 | Shankar | G06F 11/1469 |
| 11,341,163 | B1* | 5/2022 | Sridharan | G06F 16/273 |
| 2012/0173515 | A1* | 7/2012 | Jeong | G06F 16/24542 707/765 |
| 2014/0092096 | A1* | 4/2014 | Breedvelt-Schouten | G06F 40/143 345/441 |
| 2014/0279920 | A1* | 9/2014 | Madhavarapu | G06F 16/2365 707/649 |
| 2014/0279929 | A1* | 9/2014 | Gupta | G06F 11/1451 707/683 |
| 2014/0279930 | A1* | 9/2014 | Gupta | G06F 11/1471 707/683 |

(Continued)

*Primary Examiner* — Wilson Lee
(74) *Attorney, Agent, or Firm* — Mintz Levin Cohn Ferris Glovsky and Popeo, P.C.

(57) ABSTRACT

A method for providing optimized support for transactional processing and analytical processing with minimal memory footprint may include storing, on a data page in a disk of a database system, a portion of one or more columns of data from a database table. A metadata associated with the data page may be stored on a metadata page in the disk of the database system. The metadata may include one or more byte ranges on the data page at which the portion of the one or more columns of data is stored. The database system may execute one or more queries by accessing, based at least on the metadata associated with the data page, a portion of the data page storing the portion of the one or more columns of data required by the one or more queries. Related systems and articles of manufacture are also provided.

19 Claims, 7 Drawing Sheets

(56) References Cited

U.S. PATENT DOCUMENTS

| | | | |
|---|---|---|---|
| 2014/0279990 A1* | 9/2014 | Okumura | H04L 63/0807 |
| | | | 707/705 |
| 2014/0310483 A1* | 10/2014 | Bennett | G06F 3/0644 |
| | | | 711/154 |
| 2017/0031593 A1* | 2/2017 | Tsirkin | G06F 3/0631 |
| 2017/0192892 A1* | 7/2017 | Pundir | G06F 12/0873 |
| 2021/0089537 A1* | 3/2021 | Hanson | G06F 16/221 |

* cited by examiner

DISK BASED HYBRID TRANSACTIONAL ANALYTICAL PROCESSING SYSTEM

CROSS REFERENCE TO RELATED APPLICATION

This application claims priority to U.S. Provisional Application No. 63/056,304, filed on Jul. 24, 2020, entitled "DISK BASED HYBRID TRANSACTIONAL ANALYTICAL PROCESSING SYSTEM," the disclosure of which is incorporated herein by reference in its entirety.

TECHNICAL FIELD

The subject matter described herein relates generally to database processing and more specifically to a disk based implementation of a hybrid transactional analytical processing (HTAP) system.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for disk based hybrid transactional analytical processing. In some example embodiments, there is provided a system that includes at least one processor and at least one memory. The at least one memory may include program code that provides operations when executed by the at least one processor. The operations may include: storing, on a data page in a disk of a database system, one or more columns of data from a database table; storing, on a metadata page in the disk of the database system, a metadata associated with the data page, the metadata including a byte range on the data page at which the one or more columns of data are stored; and executing, by the database system, one or more queries including by accessing, based at least on the metadata associated with the data page, a portion of the data page storing the one or more columns of data required by the one or more queries.

In some variations, one or more features disclosed herein including the following features can optionally be included in any feasible combination. In some variations, the portion of the data page may be accessed by at least loading, into a memory of the database system, the portion of the data page but not the data page in its entirety.

In some variations, one or more rows of data may be received. The one or more rows of data decomposed into one or more individual cells corresponding to the one or more columns of data may be stored in a columnar buffer. In response to the columnar buffer exceeding a threshold capacity, the data page for storing the one or more columns of data may be generated.

In some variations, the database system may performs one or more input output (IO) operations in order to access the portion of the data page stored in the disk of the database system. The database system may be configured to perform the one or more input output operations by asynchronously executing one or more coroutines.

In some variations, the executing of the one or more queries may include: reading, from the disk of the database system, the portion of the data page storing the one or more columns of data required by the one or more queries; and scanning the one or more columns of data while the one or more columns of data are held in a cache of a central processing unit of the database system.

In some variations, the executing of the one or more queries may include: adding, to a query set associated with a scan of the one or more columns of data from the database table, a first query scanning the one or more columns of data and a second query scanning the one or more columns of data; storing, in a shared buffer, a first column set, a first predicate, and a first reference to a first result set reference associated with the first query; storing, in the shared buffer set, a second column set, a second predicate, and a second reference to a second result set associated with the second query; and in response to the one or more columns of data being loaded into the memory of the database system, scanning the one or more columns of data including by (i) evaluating the first predicate and the second predicate, (ii) sending, to the first result set, a first data from the one or more columns satisfying the first predicate, and (iii) sending, to the second result set, a second data from the one or more columns satisfying the second predicate.

In some variations, the first query and the second query may be added to the query set in response to the query set including less than a threshold quantity of queries permitted to scan the one or more columns of data from the database table.

In some variations, the threshold quantity of queries permitted to scan the one or more columns of data may be determined based at least on a capacity of a cache of a central processing unit of the database system.

In some variations, a load factor of the first data page may be determined. The load factor may correspond to a quantity of used space on the data page. The load factor of the data page may be determined based at least on (i) a quantity of rows in the data page visible to the one or more queries and/or (ii) one or more data definition language (DDL) executed to modify the database table.

In some variations, in response to the load factor of the data page exceeding a threshold value, the data page may be split into a plurality of data pages. In response to the load factor of the data page being below a threshold value, the data page may be merged with one or more neighboring data pages.

In some variations, the one or more queries may include one or more of a transactional processing query and an analytical processing query.

In some variations, the disk of the database system may include one or more solid state devices storing the first data page and the metadata page.

In some variations, the metadata associated with the data page may be cached in a memory of the database system.

In some variations, the one or more columns of data may be stored in the data page in a partition attribute across (PAX) format.

In some variations, the metadata associated with the data page may further include a logical page number of the data page, a pointer to a cache frame containing the data page, a row identifier range of one or more rows of the database table stored on the data page, a metadata version, a column identifier of the one or more columns, a datatype of the one or more columns, and an encoding of the one or more columns.

In another aspect, there is provided a method for disk based hybrid transactional analytical processing. The method may include: storing, on a data page in a disk of a database system, one or more columns of data from a database table; storing, on a metadata page in the disk of the database system, a metadata associated with the data page, the metadata including a byte range on the data page at which the one or more columns of data are stored; and executing, by the database system, one or more queries including by accessing, based at least on the metadata associated with the data page, a portion of the data page storing the one or more columns of data required by the one or more queries.

In some variations, one or more features disclosed herein including the following features can optionally be included in any feasible combination. The method may further include: receiving one or more rows of data; storing, in a columnar buffer, the one or more rows of data decomposed into one or more individual cells corresponding to the one or more columns of data; and in response to the columnar buffer exceeding a threshold capacity, generating the data page for storing the one or more columns of data.

In some variations, the executing of the one or more queries include: reading, from the disk of the database system, the portion of the data page storing the one or more columns of data required by the one or more queries; and scanning the one or more columns of data while the one or more columns of data are held in a cache of a central processing unit of the database system.

In some variations, the executing of the one or more queries include: adding, to a query set associated with a scan of the one or more columns of data from the database table, a first query scanning the one or more columns of data and a second query scanning the one or more columns of data; storing, in a shared buffer, a first column set, a first predicate, and a first reference to a first result set reference associated with the first query; storing, in the shared buffer set, a second column set, a second predicate, and a second reference to a second result set associated with the second query; and in response to the one or more columns of data being loaded into the memory of the database system, scanning the one or more columns of data including by (i) evaluating the first predicate and the second predicate, (ii) sending, to the first result set, a first data from the one or more columns satisfying the first predicate, and (iii) sending, to the second result set, a second data from the one or more columns satisfying the second predicate.

In another aspect, there is provided a computer program product including a non-transitory computer readable medium storing instructions. The instructions may cause operations may executed by at least one data processor. The operations may include: storing, on a data page in a disk of a database system, one or more columns of data from a database table; storing, on a metadata page in the disk of the database system, a metadata associated with the data page, the metadata including a byte range on the data page at which the one or more columns of data are stored; and executing, by the database system, one or more queries including by accessing, based at least on the metadata associated with the data page, a portion of the data page storing the one or more columns of data required by the one or more queries.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to disk based hybrid transactional analytical processing, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A majority of conventional databases may be optimized for either transactional processing (e.g., on-line transactional processing (OLTP)) or analytical processing (e.g., on-line analytical processing (OLAP)). Although a hybrid transactional analytical processing (HTAP) database may support transactional processing as well as analytical processing, a conventional hybrid transactional analytical processing database may only be optimized for in-memory computation. A conventional hybrid transactional analytical processing database may therefore impose a high total cost of ownership (TCO) at least because the cost of main memory remains one of the largest contributors to the total cost of ownership. As such, in some example embodiments, a hybrid transactional analytical processing database may be implemented on disk in order to reduce the total cost of ownership associated with the hybrid transactional analytical processing database. For example, the hybrid transactional analytical processing database may be implemented using solid state devices (SSDs), such as non-volatile memory express (NVMe) block devices, which may be configured provide the substantially the same bandwidth as dynamic random access memory (DRAM) but at a lower cost and power consumption.

Figure 1:
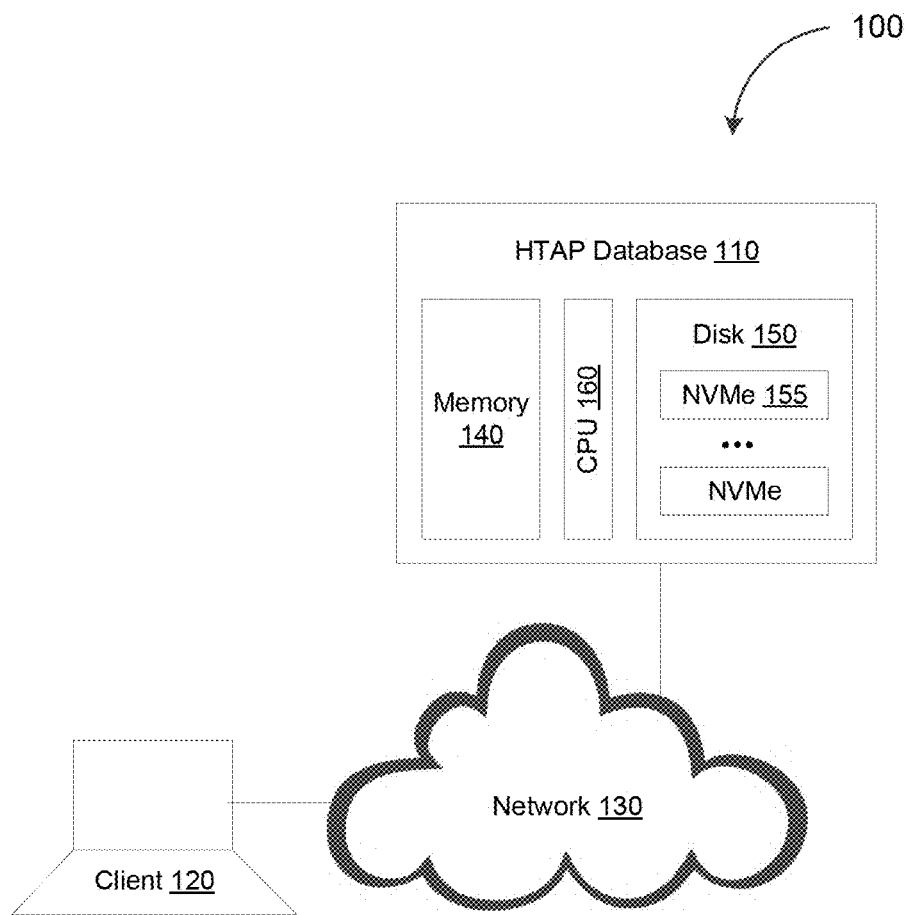
FIG. 1 depicts a system diagram illustrating an example of a database system, in accordance with some example embodiments.

FIG. 1 depicts a system diagram illustrating an example of a database system 100, in accordance with some example embodiments. Referring to FIG. 1, the database system 100 may include a hybrid transactional analytical processing (HTAP) database 110 that is coupled to a client 120 via a network 130. The network 130 may be a wired network and/or wireless network including, for example, a public land mobile network (PLMN), a local area network (LAN), a virtual local area network (VLAN), a wide area network (WAN), the Internet, and/or the like. Meanwhile, the client 130 can be a processor-based device including, for example, a mobile device, a wearable apparatus, a personal computer, a workstation, an Internet-of-Things (IoT) appliance, and/or the like.

Referring again to FIG. 1, the hybrid transactional analytical processing database 110 may include a memory 140, for example, a dynamic random access memory (DRAM) and/or the like. The hybrid transactional analytical processing database 110 may also include a disk 150 implemented using, for example, one or more solid state devices (SSDs) such as non-volatile memory express (NVMe) block devices 155. The one or more non-volatile memory express (NVMe) block devices 155, which provide persistent data storage, may provide optimal throughput (e.g., several gigabytes per second per drive), capacity (e.g., multiple terabytes), latency (e.g., 1-2 digits microseconds), and input output operation per second (TOPS) rate (e.g., up to millions). The new non-volatile memory express (NVMe) standard may also render the non-volatile memory express (NVMe) block devices 155 directly accessible from user space programs without operating system intervention.

The one or more non-volatile memory express (NVMe) block devices 155 may provide small read units, for example, 512-byte read units, 256-byte read units, and/or the like. The size of the read units associated with the one or more non-volatile memory express (NVMe) block devices 155 may correspond to 2-8 times the size of cache lines in a central processing unit (CPU) 160 used for communication with the memory 140 (e.g., dynamic random access memory (DRAM) and/or the like). That is, random access to the memory 140 is not performed in significantly smaller units than potential random access to the one or more non-volatile memory express (NVMe) block devices 155.

The bandwidth of the one or more non-volatile memory express (NVMe) block devices 155 may be comparable to the memory 140 (e.g., dynamic random access memory (DRAM) and/or the like). For example, implementing the disk 150 with ten non-volatile memory express (NVMe) block devices 155 having a 6 gigabyte per second bandwidth may achieve substantially the same bandwidth as a dynamic random access memory (DRAM) having a 64 gigabyte per second bandwidth. However, the cost associated with the one or more non-volatile memory express (NVMe) block devices 155 may be orders of magnitude lower than the dynamic random access memory (DRAM). Moreover, the one or more dynamic random access memory (DRAM) may also consume orders of magnitude less power than the dynamic random access memory (DRAM).

In some example embodiments, the hybrid transactional analytical processing database 110 may be configured to provide optimized support for transactional processing (e.g., on-line transactional processing (OLTP)), which may include executing queries from the client 120 that require modifying the data stored in the hybrid transactional analytical processing database 110. Furthermore, the hybrid transactional analytical processing database 110 may be configured to provide optimized support for analytical processing (e.g., on-line analytical processing (OLAP)), which may include executing queries from the client 120 that require evaluating (e.g., drill up, drill down, slice and dice, aggregate, sort, calculate key figures, hierarchies, and/or the like) the data stored in the hybrid transactional analytical processing database 110.

Whereas the hybrid transactional analytical processing database 110 may be optimized for transactional processing as well as analytical processing, a conventional database may be optimized for either transactional processing or analytical processing. For example, a row based database may be optimized for transactional processing whereas a column-based database may be optimized for analytical processing. Moreover, according to some example embodiments, the total cost of ownership (TOC) associated the hybrid transactional analytical processing database 110 may be reduced by implementing the hybrid transactional analytical processing database 110 on disk instead of in-memory. For example, as shown in FIG. 1, instead of the memory 140, the hybrid transactional analytical processing database 110 may be implemented on the disk 150, for example, on one or more solid state devices (SSDs) such as the one or more non-volatile memory express (NVMe) block devices 155.

Figure 2A:
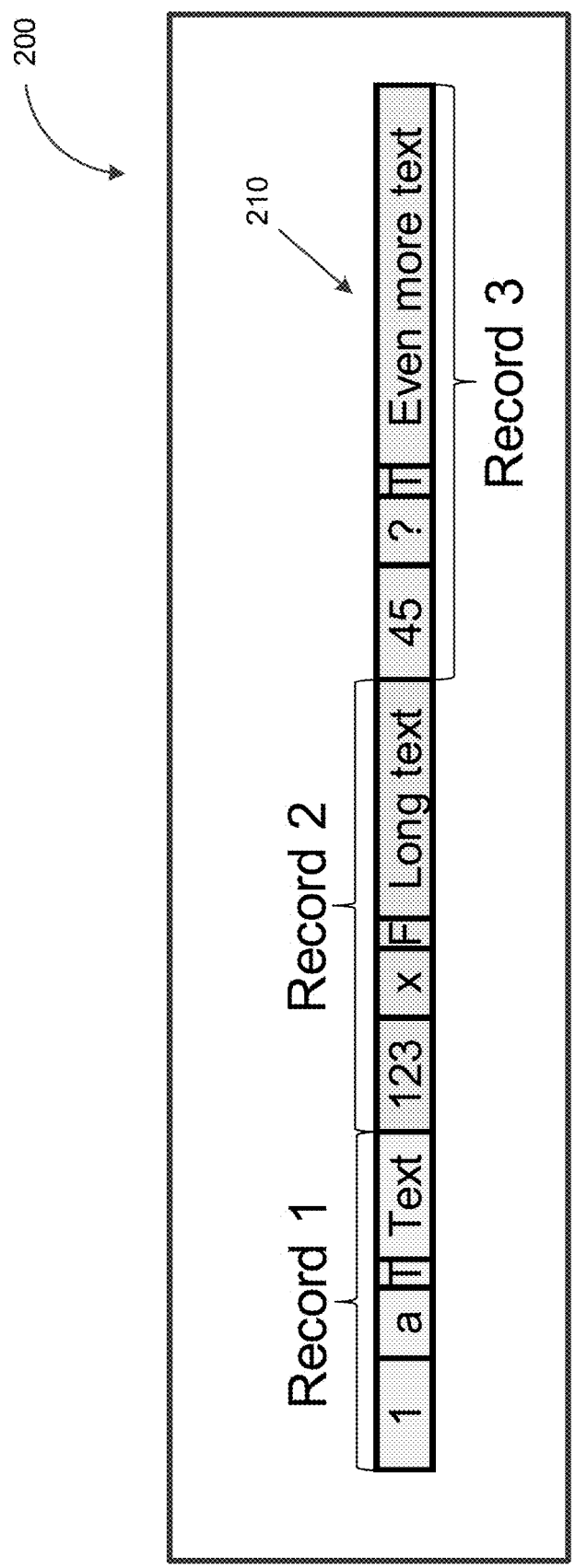
FIG. 2A depicts an example of a row based database, in accordance with some example embodiments.

To further illustrate, FIG. 2A depicts an example of a row based database 200, in accordance with some example embodiments. As shown in FIG. 2A, the rows in a database table stored in the row based database 200 may be stored in contiguous memory such that the values in the columns of the rows are stored sequentially. Because a single data page, for example, the data page 210 shown in FIG. 2A, may contain one or more entire rows from the database table (e.g., Record 1, Record 2, Record 3, and/or the like), transactional processing that modifies individual rows in the database table may be performed faster in the row based database 200. However, analytical processing may be slow in the row based database 200. For example, on-disk analytical processing may be slow because scanning one or more columns in the database table may require a full table scan and thus the loading of the entire database table from disk. In-memory analytical processing may also be slow due to poor cache locality, which may arise because cache lines may contain data from unrelated columns. Central processing unit (CPU) features, such as vectorized instructions, are not available to improve analytical processing performance in the row based database 200.

Figure 2B:
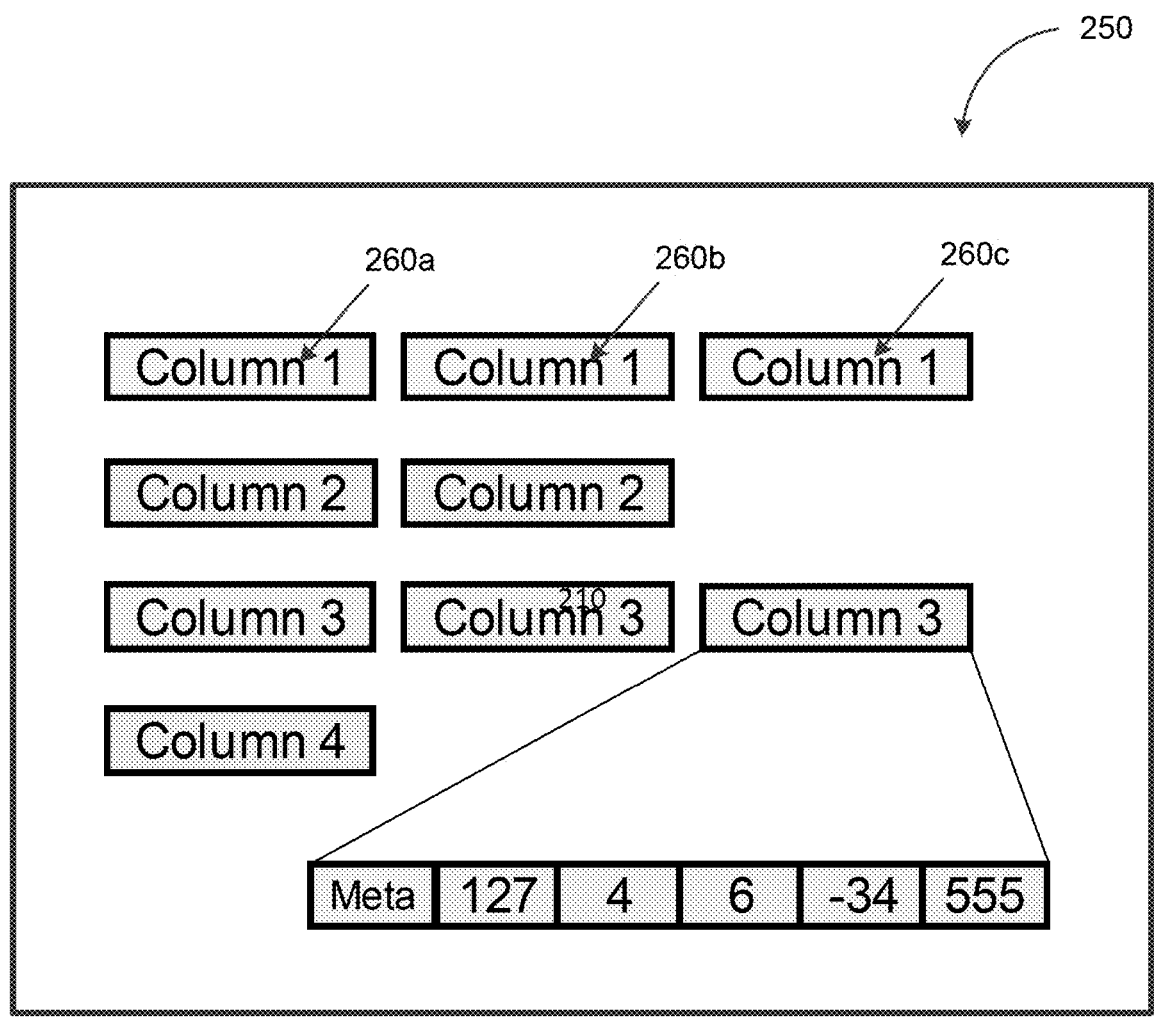
FIG. 2B depicts an example of a column based database, in accordance with some example embodiments.

FIG. 2B depicts an example of a column based database 250, in accordance with some example embodiments. As shown in FIG. 2B, the columns of a database table stored in the column based database 250 may be stored in contiguous memory (or on data pages). For example, FIG. 2B shows that a single column in a database table stored in the column based database 250 may be stored in one or more data pages such as a first data page 260a, a second data page 260b, a third data page 260c, and/or the like. For example, portions of the column may be stored across multiple data pages such that the first data page 260a, the second data page 260b, and the third data page 260c each stores a part of a column from the database table. Storing data in this manner may accelerate analytical processing because only those columns needed to perform the analytical processing may be read from memory (or disk). Moreover, central processing unit (CPU) features, such as vectorized instructions, may be available to further expedite analytical processing the column based database 250. Nevertheless, the column based database 250 may not be suitable for transactional processing because materializing a single row in the database table may require accessing multiple data pages (e.g., one data page for each column in the row). As such, a typical column based database may use only bulk loads without providing any support for transactional processing.

In some example embodiments, in order to provide optimal support for transactional processing as well as analytical processing with minimal memory footprint, the hybrid transactional analytical processing database 110 may store data in a partition attribute across (PAX) format in one or more immutable data pages, for example, in the non-volatile memory express (NVMe) block devices 155 implementing the disk 150. Each data page may include metadata identifying the contents of the data page including, for example, one or more columns and datatypes stored in the data page. This metadata may be stored redundantly in a page directory that is cached in the memory 140. Additional in-memory structures to provide optimal transactional processing and analytical processing performance may include a buffer cache for loaded data pages, columnar buffers for storing newly received data (e.g., inserts, updates, and/or the like), and a copy of the page directory identifying the contents of the data pages.

Figure 3A:
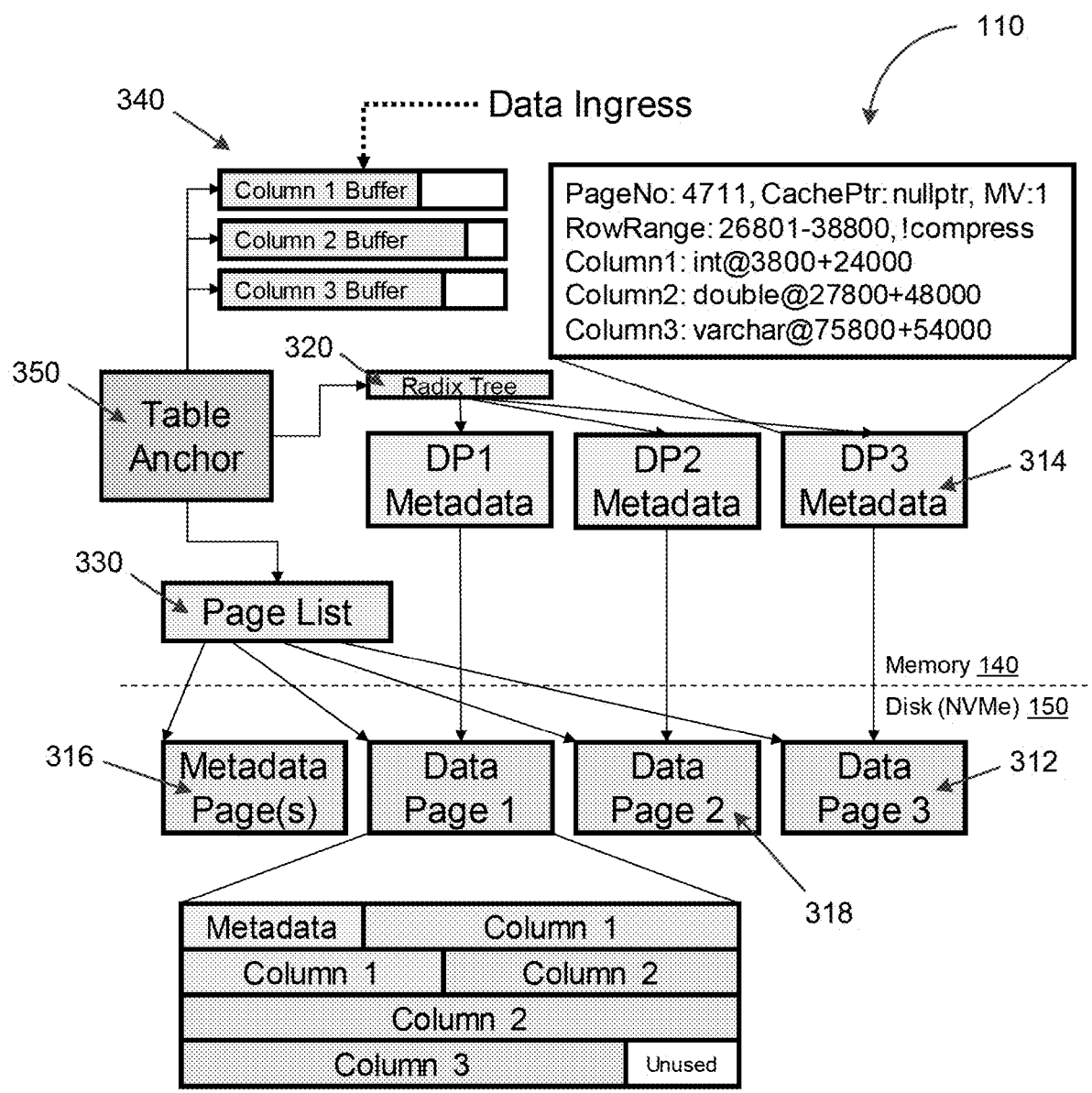
FIG. 3A depicts a schematic diagram illustrating an example of a disk based hybrid transactional analytical processing database, in accordance with some example embodiments.

To further illustrate, FIG. 3A depicts a schematic diagram illustrating an example of the hybrid transactional analytical processing database 110, in accordance with some example embodiments. In some example embodiments, data in the hybrid transactional analytical processing database 110 may be stored in a partition attribute across (PAX) format in one or more immutable data pages on the disk 150, for example, in the one or more non-volatile memory express (NVMe) block devices 155. For example, the one or more non-volatile memory express block devices 155 may store one or more metadata pages and data pages. For example, data from one or more columns in a database table may be stored in a partition attribute across (PAX) format on a data page 312 in the disk 150. As shown in FIG. 3A, the data page 312 may include multiple arrays of the various data types included in the one or more columns from the database table. Moreover, the data from the one or more columns may be prefixed with a checksum such that the integrity of the data may be verified without loading the data page 312 in its entirety. The data pages stored in the one or more non-volatile memory express (NVMe) block devices 155 may be sorted based on, for example, rows, primary keys, the temporal order in which rows are added to the data pages (e.g., which may be represented by a monotonically increasing row identifier for each newly-inserted row or a new row version after an update), and/or the like.

Referring again to FIG. 3A, the data page 312 may be associated with a metadata 314 identifying the contents of the data page 312 including, for example, the one or more columns and the datatypes stored in the data page 312. As shown in FIG. 3A, the metadata 314 associated with the data page 312 may be stored in the disk 150, for example, on one or more metadata pages 316. Moreover, FIG. 3A shows that the metadata 314 associated with the data page 312 may be cached in the memory 140 for example, as part of a page directory in a suitable data structure, such as a radix tree 320. The metadata 314 associated with the data page 312 may include a logical page number to enable a loading of the data page 312 from the disk 150, a pointer to a cache frame containing the data page 312 (e.g., if the data page 312 is present in the cache), row identifier range of one or more rows of the database table stored on the data page 312 (including a flag indicating compressed row identifier range), and metadata version to identify pages stored before last data definition language (DDL) operation to be able to migrate data accordingly on-the-fly. Furthermore, the metadata 314 associated with the data page 312 may include, for each column of the database table materialized on the data page 312, a column identifier, a datatype, an encoding, and a byte range on the data page 312 where the data of the column is located.

As shown in FIG. 3A, the memory 140 may also include another page directory, for example, a page list 330, including references to the one or more metadata pages and data pages stored in the disk 150. The memory 140 may also include one or more columnar buffers 340 storing newly received data (e.g., inserts, updates, and/or the like) for one or more columns in a database table. For example, the memory 140 may include one column buffer for each column of the database table. A table anchor 350 in the memory 140 may store references to the radix tree 320, the page list 330, and the one or more columnar buffers 340.

In some example embodiments, incoming rows of data from a database table may be decomposed into individual cells corresponding to the columns of the database table before being placed in the one or more columnar buffers 340. When the one or more columnar buffers 340 become sufficiently full to fill an entire data page (or an explicit checkpoint is executed), a new immutable data page may be created and appended to the table. For example, a new data page may be created when the columnar buffers 340 include sufficient data for a new data page. Moreover, the one or more columnar buffers 340 may be reset to ingest additional data. It should be appreciated that row identifiers may remain stable as row identifiers are generated sequentially during the ingestion of the data for each new row. Moreover, row identifier may increase monotonically such that the row identifiers may be used for quick lookups of the corresponding rows.

In some example embodiments, the visibility of the data from the database tables stored in the disk 150 for transactional processing may be determined by an external visibility framework such as, for example, multiversion concurrency control (MVCC) and/or the like. Because visibility information may include a small portion of the data from the database tables stored in the disk 150 (e.g., one bit per row over time), visibility information may be loaded into the memory 140 in its entirety. In addition to providing transactional visibility, the visibility information may also be used to identify rows of data for garbage collection. For example, a deleted row may be subject to garbage-collection when no transactions are pending to read the data associated with the row.

Garbage collection, as noted, may be performed based on the visibility information associated with the data from the database tables stored in the disk 150. As rows of data are garbage-collected, the fraction of unused space on the data pages in the disk 150 may increase. For example, when the data page 312 becomes partially used subsequent to garbage collection of one or more rows stored in the data page 312, a bitmask of deleted rows may be stored as part of the metadata 314 associated with the data page 312 and cached in the memory 140. When every row in the data page 312 are marked as deleted, the data page 312 may be deallocated.

The quantity of used space on the data page 312 may also decrease due to the execution of data definition language (DDL) statements that create and/or modify the corresponding database table. For example, one or more data definition language (DDL) statements may be executed to drop a column from the database table in which case the column may be removed from the metadata 314 associated with the data page 312 as well as freeing a corresponding quantity of bytes on the data page 312. Contrastingly, the execution of one or more data definition language statements adding a column to the database table may not necessitate any changes to the metadata 314 associated with the data page 312. One or more data definition language statements may also be executed to modify an existing column in the database table in which case the quantity of used space on the data page 312 may change in accordance to a difference in size between a previous data format and a new data format of the column.

The load factor of the data page 312, which corresponds to the quantity of used space on the data page 312, may vary due to garbage collection of one or more rows stored on the data page 312 as well as the execution of one or more data definition language (DDL) statements modifying the corresponding database table. In some example embodiments, the load factor of the data page 312 may be determined based on the visibility information (e.g., the quantity of rows in the data page 312 visible for transactional processing) and the modifications associated with the execution of one or more data definition language (DDL) statements. Moreover, the data page 312 may be merged, based on the load factor of the data page 312, with one or more neighboring data pages. For example, when the load factor of the data page 312 drops below a threshold value, the data page 312 may be merged with a data page 318 adjacent to the data page 312 in the disk 150. Alternatively and/or additionally, the data page 312 may be split into multiple data pages when the load factor of the data page 312 exceeds a threshold value. The resulting data page, which may remain immutable, may contain rows from the data page 312 as well as the data page 318 in the partition attribute across (PAX) format. Because some row identifiers may be removed during the merge, the metadata associated with merged data pages may have a set compressed row identifier flag as well as contain an additional (sorted) row identifier column to enable a quick look up of the row index within each column.

The one or more metadata page 316 storing, for example, the metadata 314 associated with the data page 312 are not subject to being overwritten in response to changes to the metadata 314. Instead, the metadata 314 associated with the data page 312 may be modified, for example, converted on the fly, when the metadata 314 is changed due the execution of one or more to modifications to the execution of one or more data definition language (DDL) statements modifying the corresponding database table. It should be appreciated that new metadata pages may be generated to accommodate new metadata associated with new data pages including, for example, new data pages that are generated by merging two existing data pages having below a threshold load factor.

The hybrid transactional analytical processing database 110 may, as noted, be configured to provide optimal support for transactional processing as well as analytical processing with minimal memory footprint. Transactional processing (e.g., on-line transactional processing (OLTP)) may include executing queries, for example, data manipulation language (DML) statements, that require modifying the data stored in the hybrid transactional analytical processing database 110. For example, for transactional processing requiring read access, the hybrid transactional analytical processing database 110 may include a buffer cache to expedite access as well as indices to facilitate point queries. For transactional processing that requires inserting and/or updating data, the hybrid transactional analytical processing database 110 may create a new row and write the new wrote into the one or more columnar buffers 340. Transactional processing that requires deleting data may be handled through data visibility (e.g., multiversion concurrency control (MVCC) operations and/or the like) and garbage collection.

Analytical processing (e.g., on-line analytical processing (OLAP)) may include executing queries that require evaluating (e.g., drill up, drill down, slice and dice, aggregate, sort, calculate key figures, hierarchies, and/or the like) the data stored in the hybrid transactional analytical processing database 110. In some example embodiments, analytical processing at the hybrid transactional analytical processing database 110 may be optimized because the properties of the one or more non-volatile memory express (NVMe) block devices 155 combined with an appropriate asynchronous execution framework (e.g., C++20 coroutines and/or the like) and the column byte ranges stored in the data page metadata may enable reading selective portions of data from the one or more non-volatile memory express (NVMe) block devices 155. With a sufficient quantity of non-volatile memory express (NVMe) block devices, these optimizations may achieve substantially the same bandwidth as in-memory processing for column scan workload, which may be one of the basic building blocks of analytical processing, In some example embodiments, executing an analytical processing query may include scanning one or more columns of a database table to identify one or more rows in the database table that match a predicate associated with the analytical processing query. Table 1 below depicts an example of pseudo programming code implementing an algorithm for performing a column scan.

TABLE 1

```
function scan([in]column set, [in]predicates, [out]result set):
   allocate column buffers for each column in column set
   for each page:
      if page is in memory:
         compute predicate match on loaded page
      else:
         for each column in column set:
            initiate I/O to load portion of the page containing the column into the respective
            column buffer (as indicated by column byte range; observing I/O alignment)
         after all I/Os completed:
            compute predicate match on column buffers
   add matched rows into result set
```

As shown in Table 1, the performance of the hybrid transactional analytical processing database 110 performing the column scan may be limited by the slowest input/output (I/O) in the path. In some example embodiments, the algorithm shown in Table 1 may be extended to initiate multiple I/Os per column in advance (e.g., multiple column parts from multiple data pages and potentially using a scatter/gather I/O functionality) to enable progress while some I/O lags as well as to make optimal use of data pages interleaved on more than one of the non-volatile memory express (NVMe) block devices 155. Nevertheless, it should be appreciated that an excessive quantity of I/Os should not be initiated per column in order to avoid a cache overflow. Moreover, the I/O may read unnecessary data to the left and to the right of the column because the I/O must be aligned on the boundary of the one or more non-volatile memory express (NVMe) block devices 155 (e.g., typically 256 bytes to 512 bytes) but the reading of unnecessary data also effectively occurs in in-memory systems as well, since data in memory are accessed using CPU cache line units, which are typically 64 or 128 bytes in size.

The I/O bandwidth of the one or more non-volatile memory express (NVMe) block devices 155 may be optimal when the average I/O size is 4 kilobytes or larger. As such, where a significant portion of a data page is required for the analytical processing query (e.g., more than 50%), the hybrid transactional analytical processing database 110 may load entire data pages into the memory 140 instead of performing a column-based partial loading. Alternatively and/or additionally, if two or more column parts required for the analytical processing query are adjacent on the page or separated just by a small portion of a column not needed for the query (e.g., ≤1 kilobytes), the hybrid transactional analytical processing database 110 performs a single I/O to fetch the two or more column parts together.

The central processing unit 160 may have a relatively large Level 3 (L3) caches (e.g., 32 megabytes or more). As such, data read from the one or more non-volatile memory express (NMVe) block devices 155 (which may be attached to a Peripheral Component Interconnect Express (PCIe) bus) may not be loaded directly into the memory 140, but may be held first in a cache (e.g., a cache hierarchy) of the hybrid transactional analytical processing database 110, for example, in the Level 3 cache of the central processing unit 160.

When an analytical processing query requires a scan of the data, with an asynchronous execution framework (e.g., C++20 coroutines), the hybrid transactional analytical processing database 110 may execute the scan as soon as the data has been read from the one or more non-volatile memory express (NMVe) block devices 155 while the data is still held in the Level 3 cache of the central processing unit 160. That is, input output operations to access the one or more non-volatile memory express (NMVe) block devices 155 may be scheduled as coroutines, which may be executed asynchronously (e.g., non-blocking) to avoid blocking threads (e.g., main user interface (UI) thread) running on the central processing unit 160 during the input output operations. Doing so may avoid cache misses as well as using the dynamic random access memory (DRAM) channel of the memory 140. With this optimization, the hybrid transactional analytical processing database 110 may be capable of outperforming an in-memory system as well as freeing bandwidth at the memory 140 for other operations (e.g., producing temporary results, doing reduce steps in query processing, and/or the like).

In some example embodiments, the hybrid transactional analytical processing database 110 may be optimized for parallel analytical processing queries. For example, if multiple analytical processing queries scan the same column individually, for example when common queries are executed by concurrent users, the available bandwidth may be split across the threads scanning the data. To avoid splitting the bandwidth of the one or more non-volatile memory express (NVMe) block devices 155 across multiple threads, multiple queries scanning the same column may scan the column cooperatively. Cooperation between multiple queries scanning the same column may speed up the parallel execution of the queries by at least reducing the quantity of data read from the one or more non-volatile memory express (NVMe) block devices 155.

Figure 3B:
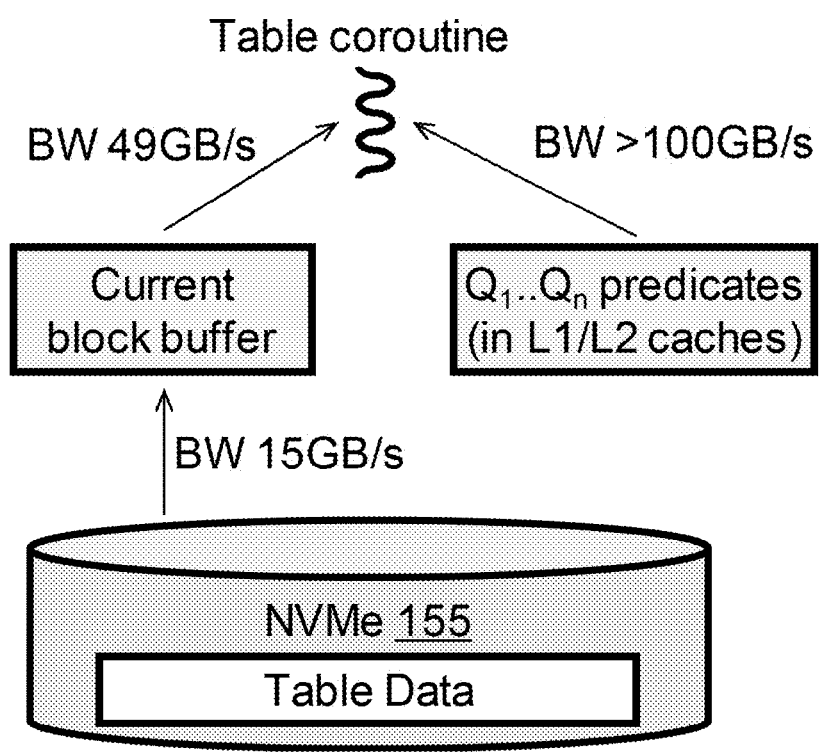
FIG. 3B depicts a schematic diagram illustrating an example of parallel analytical processing query optimization, in accordance with some example embodiments.

To further illustrate, FIG. 3B depicts a schematic diagram illustrating an example of parallel analytical processing query optimization, in accordance with some example embodiments. In some example embodiments, a first query $Q_1$ scanning a column of data and a second query $Q_2$ scanning the same column of data may cooperate in order to optimize the use of the bandwidth available at the one or more non-volatile memory express (NVMe) block devices 155. For example, upon starting the scan of the column, the first query $Q_1$ may be added to a query set associated with the scan of the column. Moreover, the column set, the predicates, and the result set reference associated with the first query $Q_1$ may be stored in a shared buffer held, for example, in a Level 1 (L1) cache and/or a Level 2 (L2) cache of the central processing unit 160. The first query $Q_1$ may scan the column of data including by fetching the data in the column from the corresponding database table sequentially. The second query $Q_2$ may join the scan at any time by being added to the query set associated with the scan of the column. Moreover, to join the scan, the column set, the predicates, and the result set reference associated with the second query $Q_2$ may be added to the shared buffer.

In some example embodiments, upon loading all of the columns required by all of the column sets associated with the first query $Q_1$ and the second query $Q_2$, the hybrid transactional analytical processing database 110 may evaluate the predicates stored in the shared buffer and send the respective results of the first query $Q_1$ and the second query $Q_2$ to the corresponding result sets in the shared buffer. In the event the scan reaches the end of the database table with queries remaining in the query set associated with the scan, the scanning of the database table may resume from the beginning. When the scan reaches a point at which a particular query was added to the query set associated with the scan, that query may be removed from query set and considered complete (e.g., entire database table was scanned).

The cooperative scanning of data stored in the one or more non-volatile memory express (NVMe) block devices 155 may be further extended to implement admission control. For example, prior to scanning the database table, the first query $Q_1$ and the second query $Q_2$ may be required to pass through an admission control queue. Concurrency control may be implemented by permitting no more than a threshold quantity of queries from the queue to scan each individual database table. Doing so may prevent the query set associated with the scan of a database table from growing beyond the capacity of the Level 1 (L1) cache and/or Level 2 (L2) cache of the central processing unit (CPU) 160.

Figure 4:
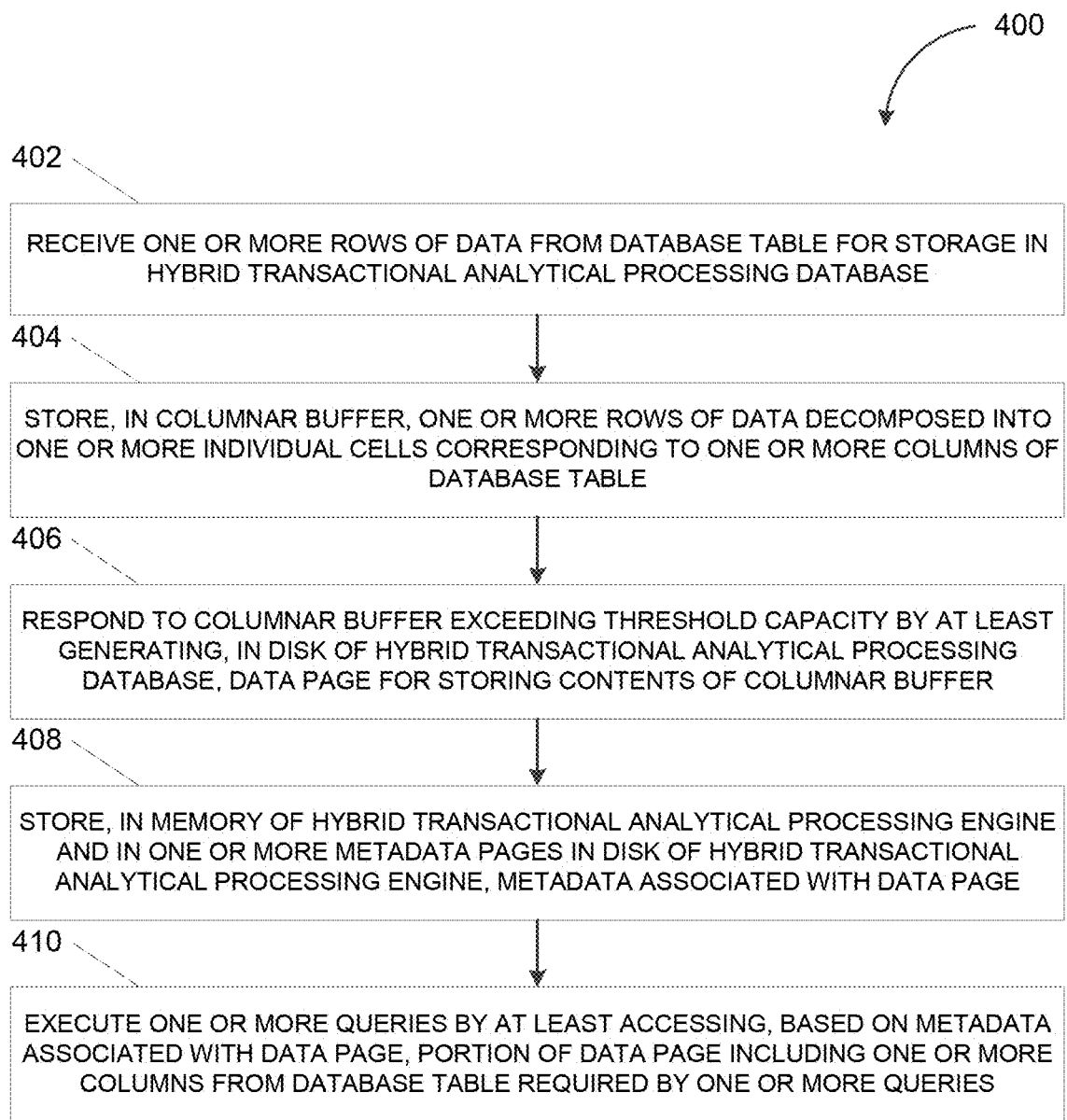
FIG. 4 depicts a flowchart illustrating an example of a process for disk based hybrid transactional analytical processing, in accordance with some example embodiments.

FIG. 4 depicts a flowchart illustrating an example of a process 400 for disk based hybrid transactional analytical processing, in accordance with some example embodiments. Referring to FIGS. 1, 3A-B, and 4, the process 400 may be performed by the hybrid transactional analytical processing database 110.

At 402, a database system may receive one or more rows of data from a database table for storage in the database. For example, the hybrid transactional analytical processing database 110 may receive, from the client 120, one or more rows of data from a database table for storing in the hybrid transactional analytical processing database 110. In some example embodiments, the hybrid transactional analytical processing database 110 may be configured to provide optimal support for transactional processing as well as analytical processing with minimal memory footprint. Accordingly, the hybrid transactional analytical processing database 110 may be configured to store the one or more rows of data in the disk 150 of the hybrid transactional analytical processing database 110 instead of the memory 140 of the hybrid transactional analytical processing database 110.

At 404, the database system may store, a columnar buffer, the one or more rows of data decomposed into one or more individual cells corresponding to one or more columns of the database table. As shown in FIG. 3A, the hybrid transactional analytical processing database 110 may include the one or more columnar buffers 340 for storing incoming data before the data is stored on data pages in the disk 150 of the hybrid transactional analytical processing database 110. Accordingly, the hybrid transactional analytical processing database 110 may store, in the one or more columnar buffers 340, the one or more rows of data received from the client 120. Moreover, as noted, the one or more rows of data received from the client 120 may be decomposed into individual cells, each of which corresponding to a column in the database table, before being placed in the one or more columnar buffers 340.

At 406, the database system may respond to the columnar buffer exceeding a threshold capacity by at least generating, in a disk of the database system, a data page for storing the contents of the columnar buffer. In some example embodiments, when the one or more columnar buffers 340 become sufficiently full to fill an entire data page (or an explicit checkpoint is executed), the hybrid transactional analytical processing database 110 may create, in the disk 150 of the hybrid transactional analytical processing database 110, a new immutable data page for storing the contents of the one or more columnar buffers 340. For example, the hybrid transactional analytical database 110 may create the data page 312 in order to store the contents of the one or more columnar buffers 340. The hybrid transactional analytical processing database 110 may further reset the one or more columnar buffers 340 such that the one or more columnar buffers 340 may ingest additional data.

In some example embodiments, the hybrid transactional analytical processing database 110 may merge and/or split the data pages in the disk 150 based on the load factor of each data page. For example, the load factor of the data page 312, which corresponds to the quantity of used space on the data page 312, may vary due to garbage collection of one or more rows stored on the data page 312 as well as the execution of one or more data definition language (DDL) statements modifying the corresponding database table. Accordingly, the load factor of the data page 312 may be determined based on the visibility information (e.g., the quantity of rows in the data page 312 visible for transactional processing and/or analytical processing) and the modifications associated with the execution of one or more data definition language (DDL) statements. The data page 312 may be merged, based on the load factor of the data page 312 being below a threshold value, with one or more neighboring data pages. Alternatively and/or additionally, the data page 312 may be split into multiple data pages when the load factor of the data page 312 exceeds a threshold value.

At 408, the database system may store, in a memory of the database system and on one or more metadata pages in the disk of the database system, metadata associated with the data page. In some example embodiments, the data page may be associated with metadata identifying the contents of the data page. For example, as shown in FIG. 3A, the metadata 314 associated with the data page 312 may include a logical page number to enable a loading of the data page 312 from the disk 150, a pointer to a cache frame containing the data page 312 (e.g., if the data page 312 is present in the cache), row identifier range of one or more rows of the database table stored on the data page 312 (including a flag indicating compressed row identifier range), and metadata version to identify pages stored before last data definition language (DDL) and migrate data accordingly on-the-fly. Furthermore, the metadata 314 associated with the data page 312 may include, for each column of the database table materialized on the data page 312, a column identifier, a datatype, an encoding, and a byte range on the data page 312 where the data of the column is located. Referring again to FIG. 3A, the data page 312 may be associated with a metadata 314 identifying the contents of the disk page 312 including, for example, the one or more columns and the datatypes stored in the disk page 312.

In some example embodiments, the metadata associated with the data page may be stored in metadata pages in the disk 150 of the hybrid transactional analytical database 110 as well as cached in the memory 140 of the hybrid transactional analytical database 110. For example, FIG. 3A shows that the metadata 314 associated with the disk page 312 may be stored in the disk 150, for example, on one or more metadata pages 316. Moreover, FIG. 3A shows that the metadata 314 associated with the disk page 312 may be cached in the memory 140 for example, as part of a page directory such as a radix tree 320 (or another data structure). The metadata 314 associated with the data page 312 may include a logical page number to enable a loading of the data page 312 from the disk 150, a pointer to a cache frame containing the data page 312 (e.g., if the data page 312 is present in the cache), row identifier range of one or more rows of the database table stored on the data page 312 (including a flag indicating compressed row identifier range), and metadata version to identify pages stored before last data definition language (DDL) and migrate data accordingly on-the-fly. Furthermore, the metadata 314 associated with the data page 312 may include, for each column of the database table materialized on the data page 312, a column identifier, a datatype, an encoding, and a byte range on the data page 312 where the data of the column is located.

At 410, the database system may execute one or more queries by at least accessing, based at least on the metadata associated with the data page, a portion of the data page storing the one or more columns from the database table required by the one or more queries. In some example embodiments, the hybrid transactional analytical processing database 110 may be configured to provide optimal support for transactional processing queries as well as analytical processing queries. These optimizations may include the metadata 314 associated with the data page 312 providing direct access to the portions of the data page 312 that include one or more columns required by a transactional processing query or an analytical processing query such that the hybrid transactional analytical processing database 110 may be able to respond to the query without loading, into the memory, the data page 312 in its entirety.

These optimizations may further include, for example, a first query $Q_1$ scanning a column of data and a second query $Q_2$ scanning the same column of data may cooperate in order to optimize the use of the bandwidth available at the one or more non-volatile memory express (NVMe) block devices 155. For example, upon starting the scan of the column, the first query $Q_1$ may be added to a query set associated with the scan of the column. Moreover, the column set, the predicates, and the result set reference associated with the first query $Q_1$ may be stored in a shared buffer held, for example, in a Level 1 (L1) cache and/or a Level 2 (L2) cache of the central processing unit 160. While the first query $Q_1$ scans the column of data, the second query $Q_2$ may join at any time by being added to the query set associated with the scan of the column. Moreover, to join the scan, the column set, the predicates, and the result set reference associated with the second query $Q_2$ may be added to the shared buffer. Once all of the columns required by all of the column sets associated with the first query $Q_1$ and the second query $Q_2$ have been loaded, the hybrid transactional analytical processing database 110 may evaluate the predicates stored in the shared buffer and send the respective results of the first query $Q_1$ and the second query $Q_2$ to the corresponding result sets in the shared buffer.

Figure 5:
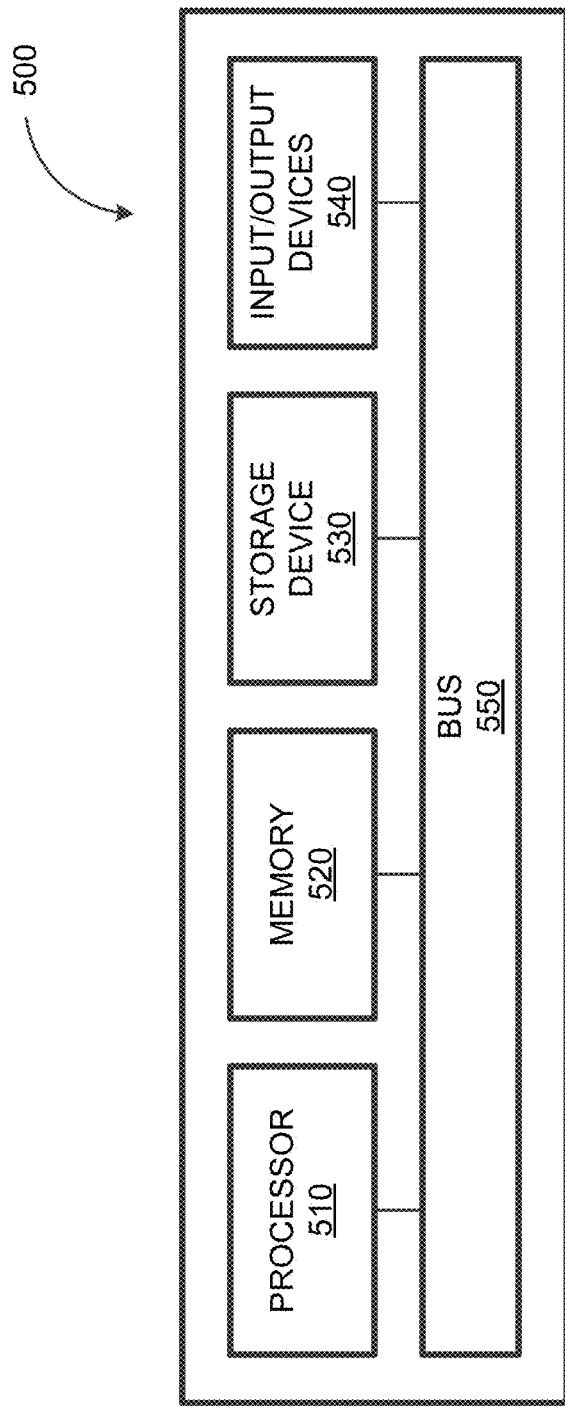
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the hybrid transactional analytical processing database 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the hybrid transactional analytical processing database 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A distributed data storage system, comprising:
   at least one data processor; and
   at least one memory storing instructions which, when executed by the at least one data processor, cause operations comprising:
     storing, on a data page in a disk of a database system, one or more columns of data from a database table;
     storing, on a metadata page in the disk of the database system, a metadata associated with the data page, the metadata including a byte range on the data page at which the one or more columns of data are stored; and
     executing, by the database system, one or more queries including by accessing, based at least on the metadata associated with the data page, a portion of the data page storing the one or more columns of data required by the one or more queries, the portion of the data page being accessed by at least loading, into a memory of the database system, the portion of the data page corresponding to the byte range indicated by the metadata but not the data page in its entirety, and the executing of the one or more queries includes scanning the one or more columns of data to identify one or more rows in the database table that match at least one predicate associated with the one or more queries.

2. The system of claim 1, further comprising:
   receiving one or more rows of data;
   storing, in a columnar buffer, the one or more rows of data decomposed into one or more individual cells corresponding to the one or more columns of data; and
   in response to the columnar buffer exceeding a threshold capacity, generating the data page for storing the one or more columns of data.

3. The system of claim 1, wherein the database system performs one or more input output (IO) operations in order to access the portion of the data page stored in the disk of the database system, and wherein the database system is configured to perform the one or more input output operations by asynchronously executing one or more coroutines.

4. The system of claim 1, wherein the executing of the one or queries comprises:
   reading, from the disk of the database system, the portion of the data page storing the one or more columns of data required by the one or more queries; and scanning the one or more columns of data while the one or more columns of data are held in a cache of a central processing unit of the database system.

5. The system of claim 1, wherein the executing of the one or more queries comprises:
adding, to a query set associated with a scan of the one or more columns of data from the database table, a first query scanning the one or more columns of data and a second query scanning the one or more columns of data;
storing, in a shared buffer, a first column set, a first predicate, and a first reference to a first result set reference associated with the first query;
storing, in the shared buffer set, a second column set, a second predicate, and a second reference to a second result set associated with the second query; and
in response to the one or more columns of data being loaded into the memory of the database system, scanning the one or more columns of data including by (i) evaluating the first predicate and the second predicate, (ii) sending, to the first result set, a first data from the one or more columns satisfying the first predicate, and (iii) sending, to the second result set, a second data from the one or more columns satisfying the second predicate.

6. The system of claim 5, wherein the first query and the second query are added to the query set in response to the query set including less than a threshold quantity of queries permitted to scan the one or more columns of data from the database table.

7. The system of claim 6, wherein the threshold quantity of queries permitted to scan the one or more columns of data is determined based at least on a capacity of a cache of a central processing unit of the database system.

8. The system of claim 1, further comprising:
determining a load factor of the first data page, the load factor corresponding to a quantity of used space on the data page, and the load factor of the data page being determined based at least on (i) a quantity of rows in the data page visible to the one or more queries and/or (ii) one or more data definition language (DDL) executed to modify the database table.

9. The system of claim 4, further comprising:
in response to the load factor of the data page exceeding a threshold value, splitting the data page into a plurality of data pages; and
in response to the load factor of the data page being below a threshold value, merging the data page with one or more neighboring data pages.

10. The system of claim 1, wherein the one or more queries include one or more of a transactional processing query and an analytical processing query.

11. The system of claim 1, wherein the disk of the database system comprises one or more solid state devices storing the first data page and the metadata page.

12. The system of claim 1, further comprising:
caching, in a memory of the database system, the metadata associated with the data page.

13. The system of claim 1, wherein the one or more columns of data are stored in the data page in a partition attribute across (PAX) format.

14. The system of claim 1, wherein the metadata associated with the data page further includes a logical page number of the data page, a pointer to a cache frame containing the data page, a row identifier range of one or more rows of the database table stored on the data page, a metadata version, a column identifier of the one or more columns, a datatype of the one or more columns, and/or an encoding of the one or more columns.

15. A computer-implemented method, comprising:
storing, on a data page in a disk of a database system, one or more columns of data from a database table;
storing, on a metadata page in the disk of the database system, a metadata associated with the data page, the metadata including a byte range on the data page at which the one or more columns of data are stored; and
executing, by the database system, one or more queries including by accessing, based at least on the metadata associated with the data page, a portion of the data page storing the one or more columns of data required by the one or more queries, the portion of the data page being accessed by at least loading, into a memory of the database system, the portion of the data page corresponding to the byte range indicated by the metadata but not the data page in its entirety, and the executing of the one or more queries includes scanning the one or more columns of data to identify one or more rows in the database table that match at least one predicate associated with the one or more queries.

16. The method of claim 15, further comprising:
receiving one or more rows of data;
storing, in a columnar buffer, the one or more rows of data decomposed into one or more individual cells corresponding to the one or more columns of data; and
in response to the columnar buffer exceeding a threshold capacity, generating the data page for storing the one or more columns of data.

17. The method of claim 15, wherein the executing of the one or more queries comprises:
reading, from the disk of the database system, the portion of the data page storing the one or more columns of data required by the one or more queries; and
scanning the one or more columns of data while the one or more columns of data are held in a cache of a central processing unit of the database system.

18. The method of claim 15, wherein the executing of the one or more queries comprises:
adding, to a query set associated with a scan of the one or more columns of data from the database table, a first query scanning the one or more columns of data and a second query scanning the one or more columns of data;
storing, in a shared buffer, a first column set, a first predicate, and a first reference to a first result set reference associated with the first query;
storing, in the shared buffer set, a second column set, a second predicate, and a second reference to a second result set associated with the second query; and
in response to the one or more columns of data being loaded into the memory of the database system, scanning the one or more columns of data including by (i) evaluating the first predicate and the second predicate, (ii) sending, to the first result set, a first data from the one or more columns satisfying the first predicate, and (iii) sending, to the second result set, a second data from the one or more columns satisfying the second predicate.

19. A non-transitory computer readable medium storing instructions, which when executed by at least one data processor, result in operations comprising:
storing, on a data page in a disk of a database system, one or more columns of data from a database table;
storing, on a metadata page in the disk of the database system, a metadata associated with the data page, the metadata including a byte range on the data page at which the one or more columns of data are stored; and executing, by the database system, one or more queries including by accessing, based at least on the metadata associated with the data page, a portion of the data page storing the one or more columns of data required by the one or more queries, the portion of the data page being accessed by at least loading, into a memory of the database system, the portion of the data page corresponding to the byte range indicated by the metadata but not the data page in its entirety, and the executing of the one or more queries includes scanning the one or more columns of data to identify one or more rows in the database table that match at least one predicate associated with the one or more queries.

* * * * *